(12) United States Patent
Kwon et al.

(10) Patent No.: US 12,535,602 B2
(45) Date of Patent: Jan. 27, 2026

(54) METHOD AND APPARATUS FOR TRAINING NUCLIDE IDENTIFICATION MODEL

(71) Applicant: KOREA ATOMIC ENERGY RESEARCH INSTITUTE, Daejeon (KR)

(72) Inventors: Inyong Kwon, Daejeon (KR); Dongseong Shin, Daejeon (KR); Jin Suk Oh, Daejeon (KR); Hyeonmin Kim, Daejeon (KR); Chang Hwoi Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 990 days.

(21) Appl. No.: 17/672,091

(22) Filed: Feb. 15, 2022

(65) Prior Publication Data

US 2022/0291399 A1     Sep. 15, 2022

(30) Foreign Application Priority Data

Mar. 9, 2021   (KR) .......................... 10-2021-0030884

(51) Int. Cl.
*G06N 3/08*     (2023.01)
*G01T 1/166*    (2006.01)
*G01T 1/29*     (2006.01)
*G01T 7/00*     (2006.01)

(52) U.S. Cl.
CPC .......... *G01T 1/1663* (2013.01); *G01T 1/2985* (2013.01); *G01T 7/00* (2013.01); *G06N 3/08* (2013.01)

(58) Field of Classification Search
CPC ....... G01T 1/1663; G01T 1/2985; G01T 7/00; G01T 1/36; G06N 3/08; G06N 3/09; G06N 3/04; Y02E 30/30
See application file for complete search history.

(56) References Cited

U.S. PATENT DOCUMENTS 5,672,928 A  *  9/1997  Terhune ................... G21H 1/00
                                                      310/305
2001/0048730 A1 * 12/2001 Oshima ..................... G01T 1/24
                                                      376/157

(Continued)

FOREIGN PATENT DOCUMENTS

JP         2014/524018 A      9/2014
KR         102051576 B1      12/2019

OTHER PUBLICATIONS

Rapid Nuclide identification algorithm based on convolutional neural network. Annals of Nuclear Energy 133 (2019) 483-490 (Year: 2019).*

(Continued)

*Primary Examiner* — Hien L Duong
(74) *Attorney, Agent, or Firm* — Harness, Dickey & Pierce, P.L.C.

(57) ABSTRACT

A method for training an apparatus for training a nuclide identification model is provided. In the method, nuclide data is classified into characteristics of energy spectrums for nuclides, training data is generated based on a number of data in each of the classified characteristics, and the nuclide identification model is trained by using the training data.

6 Claims, 8 Drawing Sheets

(56) References Cited

U.S. PATENT DOCUMENTS

| | | | | |
|---|---|---|---|---|
| 2008/0011962 A1* | 1/2008 | Russ | ............................ | G01T 1/36 |
| | | | | 250/395 |
| 2010/0030489 A1* | 2/2010 | Chioeu | .................... | G01T 1/178 |
| | | | | 250/336.1 |
| 2011/0270536 A1* | 11/2011 | Nelson | .................... | G16C 20/30 |
| | | | | 702/30 |
| 2013/0277556 A1* | 10/2013 | Li | .............................. | G01T 7/00 |
| | | | | 250/336.1 |
| 2017/0146668 A1* | 5/2017 | Evrard | ........................ | G01T 1/20 |
| 2019/0353822 A1* | 11/2019 | Labov | ...................... | G01V 5/281 |
| 2022/0035058 A1* | 2/2022 | Liang | ........................ | G01T 1/362 |
| 2023/0288585 A1* | 9/2023 | Hanada | .................... | G01T 1/167 |

OTHER PUBLICATIONS

Korean Office Action dated Jul. 7, 2022, issued in corresponding Korean Patent Application No. 10-2021-0030884.

* cited by examiner

| SOURCE | ACTIVITY | MEASUREMENT TIME | MEASUREMENT DATA NUM. | FWHM | CLASS NUM. |
|---|---|---|---|---|---|
| BACKGROUND | # | 1:35:27 | $10^5$ COUNTS | # | 0 |
| Cs-137 | 5 μCi | 1:05:53 | $10^5$ COUNTS | 10.03% | 1 |
| Co-60 | 0.6035 μCi | 1:10:14 | $10^5$ COUNTS | $1^{st}$ 29.73%, $2^{nd}$ 26.70% | 2 |
| Cs-137+Co-60 | # | 1:13:29 | $10^5$ COUNTS | Cs-137:14.30% Co-60:$1^{st}$ 30.89%,$2^{nd}$ 21.02% | 3 |

METHOD AND APPARATUS FOR TRAINING NUCLIDE IDENTIFICATION MODEL

CROSS-REFERENCE TO RELATED APPLICATION

This application claims priority to Korean Patent Application No. 10-2021-0030884, filed on Mar. 9, 2021. The entire contents of the application on which the priority is based are incorporated herein by reference.

TECHNICAL FIELD

The present disclosure relates to a method for training a nuclide identification model and an apparatus for performing the method.

This work was supported by the Energy Technology Program of the Korea Institute of Energy Technology Evaluation and Planning (KETEP) granted financial resource from the Ministry of Trade, Industry & Energy, Republic of Korea (No. 20191510301290).

BACKGROUND

It is well known that when a radiation measurement system is used to acquire data, unique energy peak values may be obtained for different radiation sources. When a histogram is obtained based on the energy peak data, it becomes possible to identify a nuclide from which radiation is incident.

However, when a small amount of measurement data is provided, it is difficult to identify a nuclide. Thus, a long period of time, i.e. several hours or more is required for data collection since at least tens of thousands pieces of measurement data are required, and the accuracy of identifying the nuclide becomes significantly low when multiple nuclides are mixed.

Recently, in order to rapidly identify the nuclide, many studies have been conducted to apply a learning algorithm using an artificial neural network model such as Deep Neural Network (DNN) or Convolution Neural Network (CNN).

However, the related art is problematic in that about 100,000 pieces of radiation measurement data are required to accurately identify the nuclide even if the artificial neural network model is used, and thereby a long period of time for measurement and a long period of time for identification are required.

RELATED ART

Patent Document 1: Korean patent No. 10-2051576

SUMMARY

In view of the above, an embodiment of the present disclosure provides a method and an apparatus for training a nuclide identification model, in which training data is generated by performing preprocessing on nuclide data to accurately identify a nuclide within a short period of time even though a small amount of radiation measurement data corresponding to nuclide data is provided (that is, even when the measurement time is short).

Technical objects to be achieved by the present disclosure are not limited to those described above, and other technical objects not mentioned above may also be clearly understood from the descriptions given below by those skilled in the art to which the present disclosure belongs.

In accordance with an aspect of the present disclosure, there is provided a method for training an apparatus for training a nuclide identification model, the method including: classifying nuclide data into characteristics of energy spectrums for nuclides; generating training data based on a number of data in each of the classified characteristics; and training the nuclide identification model by using the training data.

In accordance with another aspect of the present disclosure, there is s provided an apparatus for training a nuclide identification model, the apparatus including: an input unit configured to receive nuclide data; a processing unit configured to process the nuclide data; and a model unit comprising a nuclide identification model. The processing unit is configured to classify the nuclide data into characteristics of energy spectrums for nuclides, generate training data based on a number of data in each of the classified characteristics, and train the nuclide identification model by using the training data.

In accordance with still another aspect of the present disclosure, there is provided a non-transitory computer-readable storage medium including computer-executable instructions which cause, when executed by a processor, the processor to perform the method described above for training the apparatus for training the nuclide identification model.

According to the aspects of the present disclosure, the training data is generated by performing the preprocessing on the nuclide data, so that it is possible to accurately identify a nuclide within a short period of time even though a small amount of radiation measurement data corresponding to the nuclide data is provided (that is, even when the measurement time is short).

DETAILED DESCRIPTION

Advantages and features of the present disclosure, and a method of achieving them will become apparent with reference to an embodiment described later together with the accompanying drawings. However, the present disclosure is not limited to an embodiment disclosed below, but may be implemented in a variety of different forms. That is, the embodiment is provided to ensure that descriptions of the present disclosure are complete and to fully inform a scope of the invention to a person with ordinary knowledge in a technical field to which the present disclosure belongs, and the invention is only defined by the scope of claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components such as software components, object-oriented software components, class components, and task components, processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 1:
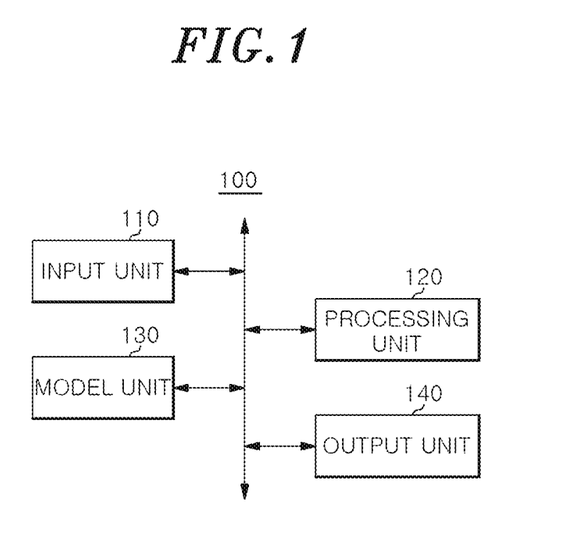
FIG. 1 is a diagram illustrating an exemplary configuration of an apparatus for training a nuclide identification model in accordance with an embodiment of the present disclosure.

FIG. 1 is a diagram illustrating an exemplary configuration of an apparatus 100 for training a nuclide identification model in accordance with an embodiment of the present disclosure. The configuration shown in FIG. 1 is merely an example, and the apparatus 100 for training the nuclide identification model may be implemented in a personal computer (PC) or a server or may include the PC or the server.

Referring to FIG. 1, the apparatus 100 for training the nuclide identification model (hereinafter, also referred to as "training apparatus 100") may include an input unit 110, a processing unit 120, and a model unit 130, and may further include an output unit 140.

The input unit 110 is configured to receive nuclide data (e.g., radiation measurement data for a nuclide). For example, the input unit 110 may receive, as raw data for a complex nuclide, background data, radiation measurement data for a single nuclide, and radiation measurement data. Here, the raw data is the nuclide data. For instance, in the case of the complex nuclide of cesium (Cs)-137 and cobalt (Co)-60, background data that is measurement data when there is no radiation source, radiation measurement data when there is only Cs-137, radiation measurement data when there is only Co-60, and radiation measurement data when there are both Cs-137 and Co-60 may be input as the raw data.

The processing unit 120 is configured to classify the nuclide data into characteristics of energy spectrums for nuclides, generate training data based on a result that is obtained by counting the number of data (i.e. the total number of data) in each of the classified characteristics (that is, based on the number of data in each of the classified characteristics), and train a nuclide identification model of the model unit 130 by using the generated training data. For example, the processing unit 120 may sort the raw data input through the input unit 110 into characteristics of energy peaks for the nuclides. Here, the characteristics of the energy peaks for the nuclides correspond to the characteristics of the energy spectrums for the nuclides and the energy spectrum may indicate a histogram showing the number of times that an energy peak is detected. For instance, the processing unit 120 may sort the characteristics of the energy peaks for the nuclides into one or more sections including at least one of back scatter, photo peak, and Compton edge (that is, the raw data is sorted into the characteristics of the energy peaks for the nuclides based on one or more sections including at least one of back scatter, photo peak, and Compton edge), and may generate training data by including the number of radiation measurement data for each of the sections in the training data. For example, the training data is the number of radiation measurement data in each of the sections. Such a process in which the processing unit 120 does not generate training data by directly using the raw data but generates the training data through a predetermined processing procedure with raw data may be referred to as a preprocessing process prior to the training of the model. For example, the processing unit 120 may include a memory that stores a command programmed to perform a function capable of training the nuclide identification model of the model unit 130, and a microprocessor that executes such a command.

The model unit 130 is configured to train the nuclide identification model with the training data generated through the preprocessing by the processing unit 120 under the control of the processing unit 120. For example, the nuclide identification model may include an artificial neural network model such as a deep neural network (DNN) and a convolution neural network (CNN). For instance, the artificial neural network model may include an input layer, a hidden layer, and an output layer. A ReLU function may be applied to the hidden layer, and a softmax function may be applied to the output layer.

Then, when the nuclide data that is a nuclide identification target is input to the trained model unit 130 through the input unit 110, the trained model unit 130 may provide a nuclide identification result as an output of the nuclide identification model. For example, when the nuclide data that is the nuclide identification target is input to the trained model unit 130, the trained model unit 130 may determine a result value for each predetermined class and provide the determined result value as the nuclide identification result corresponding to the nuclide data. For instance, it is possible to provide one or more identification result values for respective classes including at least one of an identification result value for the nuclide data being the background data, an identification result value for the nuclide data being the single nuclide radiation measurement data, and an identification result value for the nuclide data being the complex nuclide radiation measurement data. For example, the model unit 130 may include a memory that stores commands programmed to perform the function of training the training data and/or the function of providing the nuclide identification result value corresponding to the nuclide data, and a microprocessor that executes such commands.

The output unit 140 is configured to output various processing results obtained through the processing unit 120 and/or the identification result values obtained through the model unit 130 under the control of the processing unit 120. For example, the output unit 140 may output the nuclide identification result values of the model unit 130. The output unit 140 may visualize and display the nuclide identification result values on an external device, for example. The output unit 140 may include a port, a wired communication module, or a wireless communication module through which the nuclide identification result value is output. Alternatively, the output unit 140 may include an image display device through which an image of the nuclide identification result value is output.

Figure 2:
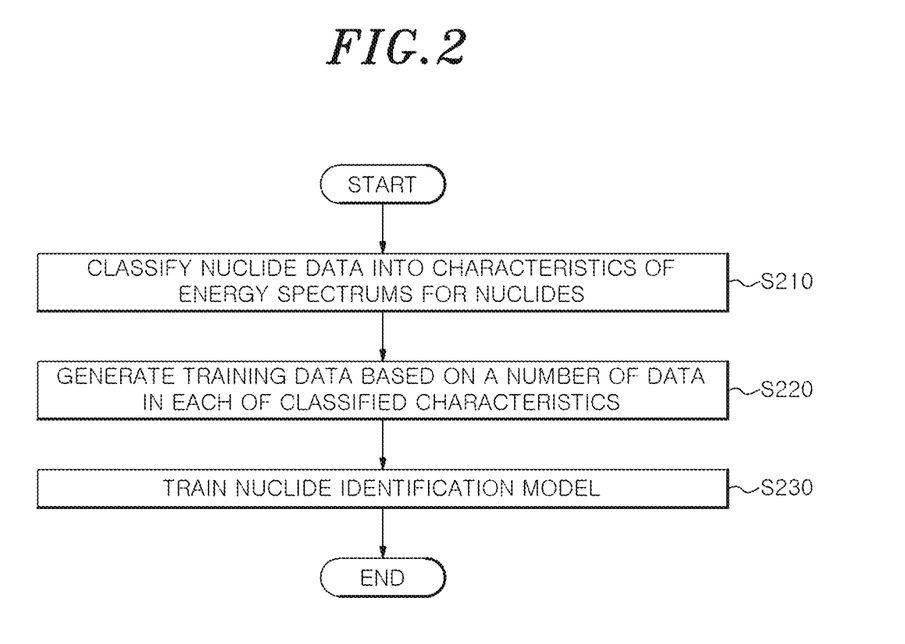
FIGS. 2 and 3 are flowcharts illustrating a method for training the nuclide identification model in accordance with the embodiment of the present disclosure.
Figure 3:
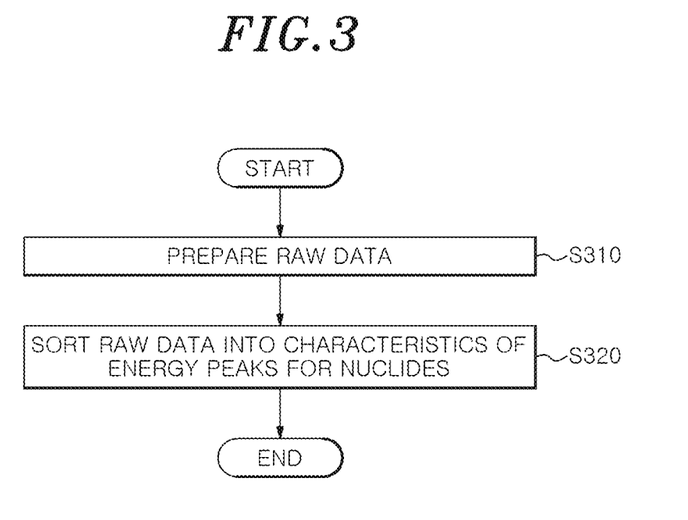

FIGS. 2 and 3 are flowcharts illustrating a method for training the nuclide identification model in accordance with the embodiment of the present disclosure.

As shown in FIGS. 2 and 3, the method for training the nuclide identification model according to the embodiment includes a step S210 of classifying nuclide data into characteristics of energy spectrums for nuclides, a step S220 of generating training data based on a result that is obtained by counting the number of data in each of the classified characteristics, and a step S230 of training the nuclide identification model by using the generated training data.

The step S210 may include a step S310 of preparing, as raw data for the complex nuclide, background data, single nuclide radiation measurement data, and complex nuclide radiation measurement data, and a step S320 of sorting the raw data into characteristics of energy peaks for the nuclides being the characteristics of the energy spectrums for the nuclides.

In step S310, the characteristics of the energy peaks for the nuclides may be sorted into one or more sections including at least one of back scatter, photo peak, and Compton edge (that is, the raw data is sorted into the characteristics of the energy peaks for the nuclides based on one or more sections including at least one of back scatter, photo peak, and Compton edge). Further, the training data may include the number of radiation measurement data for each of the plurality of sections.

Hereinafter, the process of training the nuclide identification model and the process of identifying the complex nuclide by the training apparatus 100 according to the embodiment will be described in detail with reference to FIGS. 1 to 5.

First, the nuclide data for training the model unit 130 of the training apparatus 100 is prepared and then is input to the training apparatus 100 through the input unit 110. For example, the raw data including classes such as the background data, the single nuclide radiation measurement data, and the complex nuclide radiation measurement data with respect to the complex nuclide may be used as the nuclide data. For instance, in the case of the complex nuclide of Cs-137 and Co-60, the background data that is measurement data when there is no radiation source, the radiation measurement data when there is only Cs-137, the radiation measurement data when there is only Co-60, and the radiation measurement data when there are both Cs-137 and Co-60 may be input as the raw data. The number of raw data is not particularly limited, and 100 sets or more for each class may be input, in consideration of the accuracy of the nuclide identification of the training apparatus 100 that has been trained.

Then, the processing unit 120 of the training apparatus 100 classifies the nuclide data that is input through the input unit 110 into the characteristics of the energy spectrums for nuclides (step S210).

In step S210, when the raw data of the prepared complex nuclide is input through the input unit 110 (step S310), the processing unit 120 may sort the input raw data into the characteristics of the energy peaks for the nuclides being the characteristics of the energy spectrums for the nuclides of the input raw data (step S320). For instance, the processing unit 120 may sort the characteristics of the energy peaks for the respective nuclides into one or more sections including at least one of back scatter, photo peak, and Compton edge.

Then, the processing unit 120 generates training data based on the result that is obtained by counting the number of data in each of the classified characteristics of step S210. For example, the processing unit 120 may include, in the training data, the number of radiation measurement data for each of the sections sorted in step S320.

Figure 4:
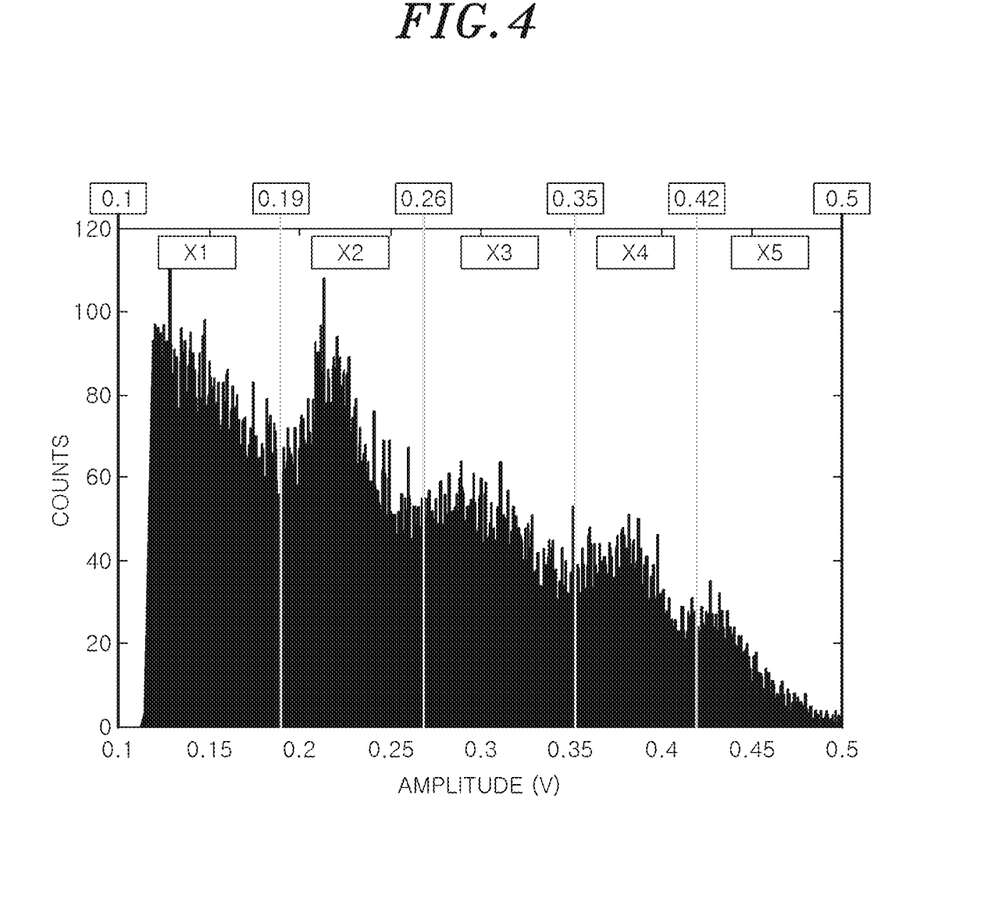
FIG. 4 illustrates generation of training data from nuclide data of a complex nuclide of Cs-137 and Co-60.

FIG. 4 illustrates the generation of the training data from the nuclide data of the complex nuclide of Cs-137 and Co-60. X1 is the back scatter, X2 is the photo peak of Cs, X3 is the Compton edge, X4 is a first photo peak of Co, and X5 is a second photo peak of Co. The processing unit 120 may generate the number of radiation measurement data for each section and identification information on each section as a training dataset.

Next, the processing unit 120 trains the nuclide identification model of the model unit 130 by using the training data generated in step S220. For example, the processing unit 120 may train the nuclide identification model of the model unit 130 for respective classes such as the background data, the single nuclide radiation measurement data, and the complex nuclide radiation measurement data, with respect to the training data generated in step S220.

Figure 5:
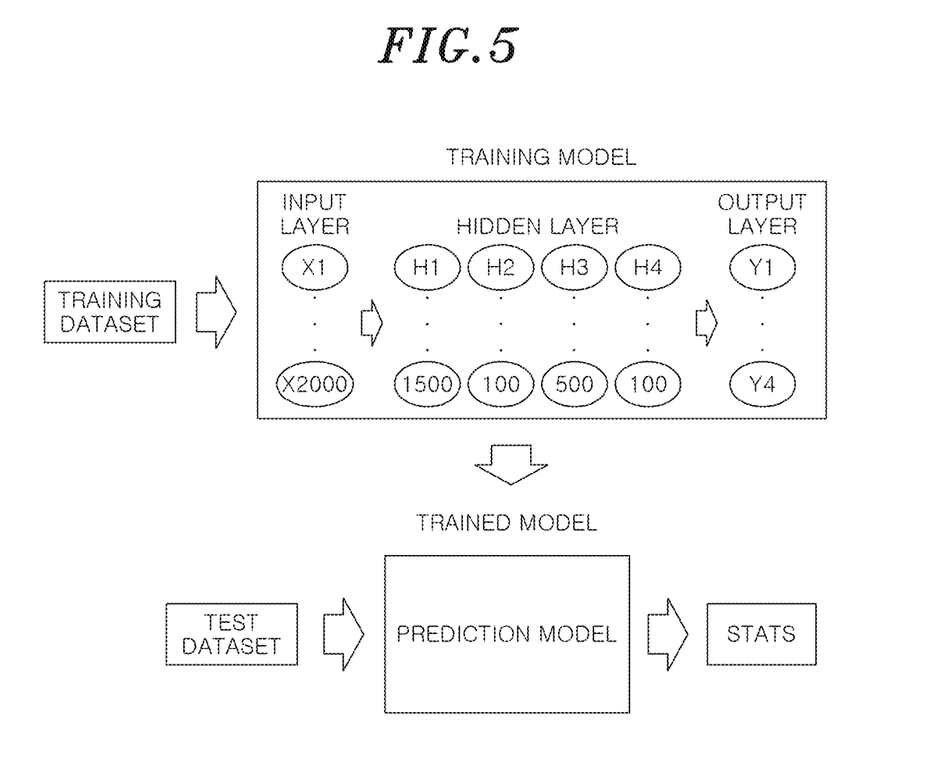
FIG. 5 illustrates a process of training the nuclide identification model of the apparatus for training the nuclide identification model and a process of identifying the complex nuclide by the trained nuclide identification model in accordance with the embodiment of the present disclosure.

FIG. 5 illustrates a process of training the nuclide identification model of the training apparatus 100 and a process of identifying the complex nuclide by the trained nuclide identification model in accordance with the embodiment of the present disclosure. The nuclide identification model trained through step S210 to step S230, step S310, and step S320 may output, when the dataset including the nuclide data is input, an identification value that indicates the identification of the nuclide of the corresponding dataset. For example, when the dataset including the classes such as the background data, the single nuclide radiation measurement data, and the complex nuclide radiation measurement data is input to the trained nuclide identification model, an identification value that indicates the identification of the nuclide for each class may be output. For instance, it is possible to output an identification result value for determining whether the nuclide data is the background data, an identification result value for determining whether the nuclide data is the single nuclide radiation measurement data, and an identification result value for determining whether the nuclide data is the complex nuclide radiation measurement data.

Figure 6:
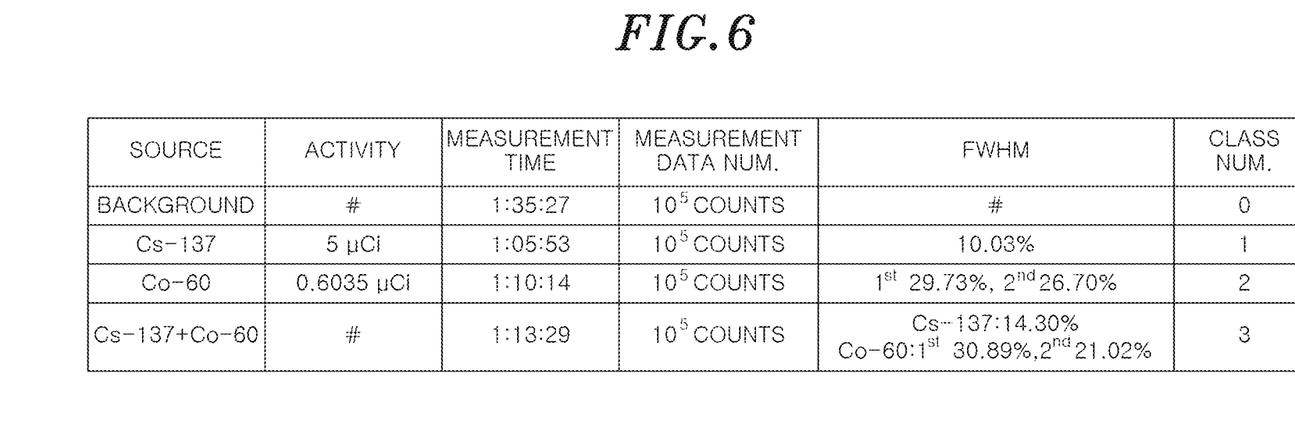
FIG. 6 illustrates a measurement time and a full width half maximum (FWHM) for the complex nuclide of Cs-137 and Co-60 according to a class.
Figure 7:
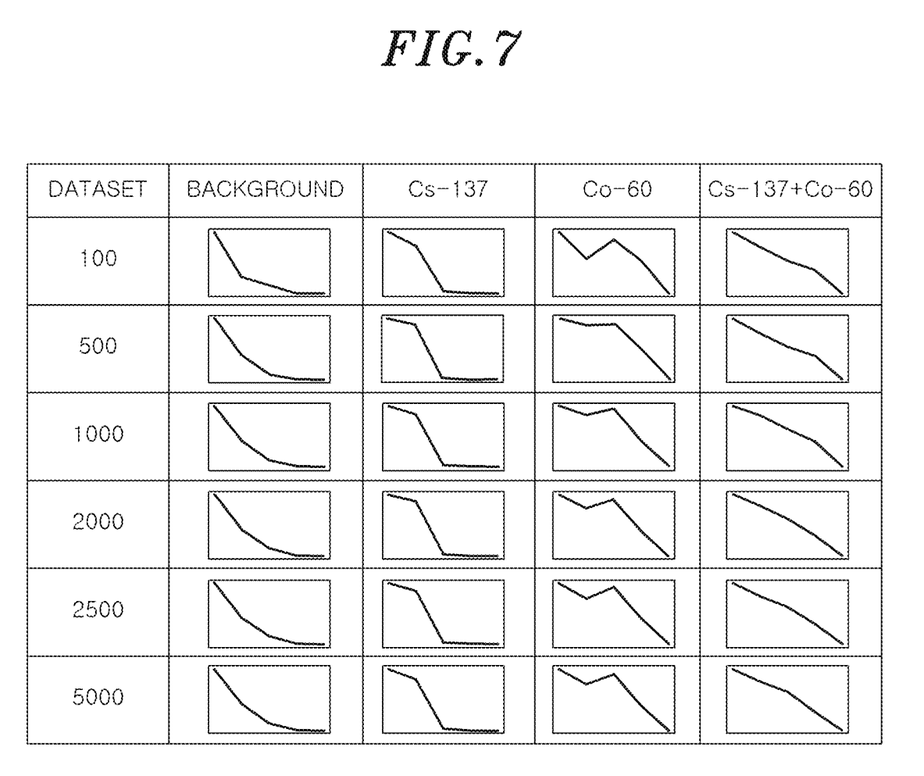
FIG. 7 illustrates a histogram accumulated according to a class by applying a preprocessing technique to the nuclide data.

Hereinafter, a case in which the artificial neural network model is trained after the preprocessing is performed on the nuclide data in accordance with the embodiment of the present disclosure and a case in which the artificial neural network model is trained without the preprocessing for the nuclide data will be compared with reference to FIGS. 6 to 8.

As for the nuclide data, 100,000 pieces of data for the nuclide data were measured and prepared according to each of a total of four cases including background data, Cs-137 measurement data, Co-60 measurement data and Cs-137/Co-60 measurement data. At this time, the measurement time and the full width half maximum (FWHM) are shown in FIG. 6.

After 100, 500, 1000, 2000, 2500, and 5000 pieces of data are extracted for each class from the prepared data and then are arranged according to size, the preprocessing technique of step S210 is applied to obtain a histogram. The histogram is obtained by counting the number of the data in each of X1 to X5 as shown in FIG. 7.

After 400,000 preprocessed datasets are arranged into a 5000×80 matrix, they are divided into a training dataset and a test dataset in a ratio of 7:3. Then, the nuclide identification model of the model unit 130 was trained using the training dataset, and the accuracy of the pre-trained model unit 130 was verified using the test dataset.

Figure 8:
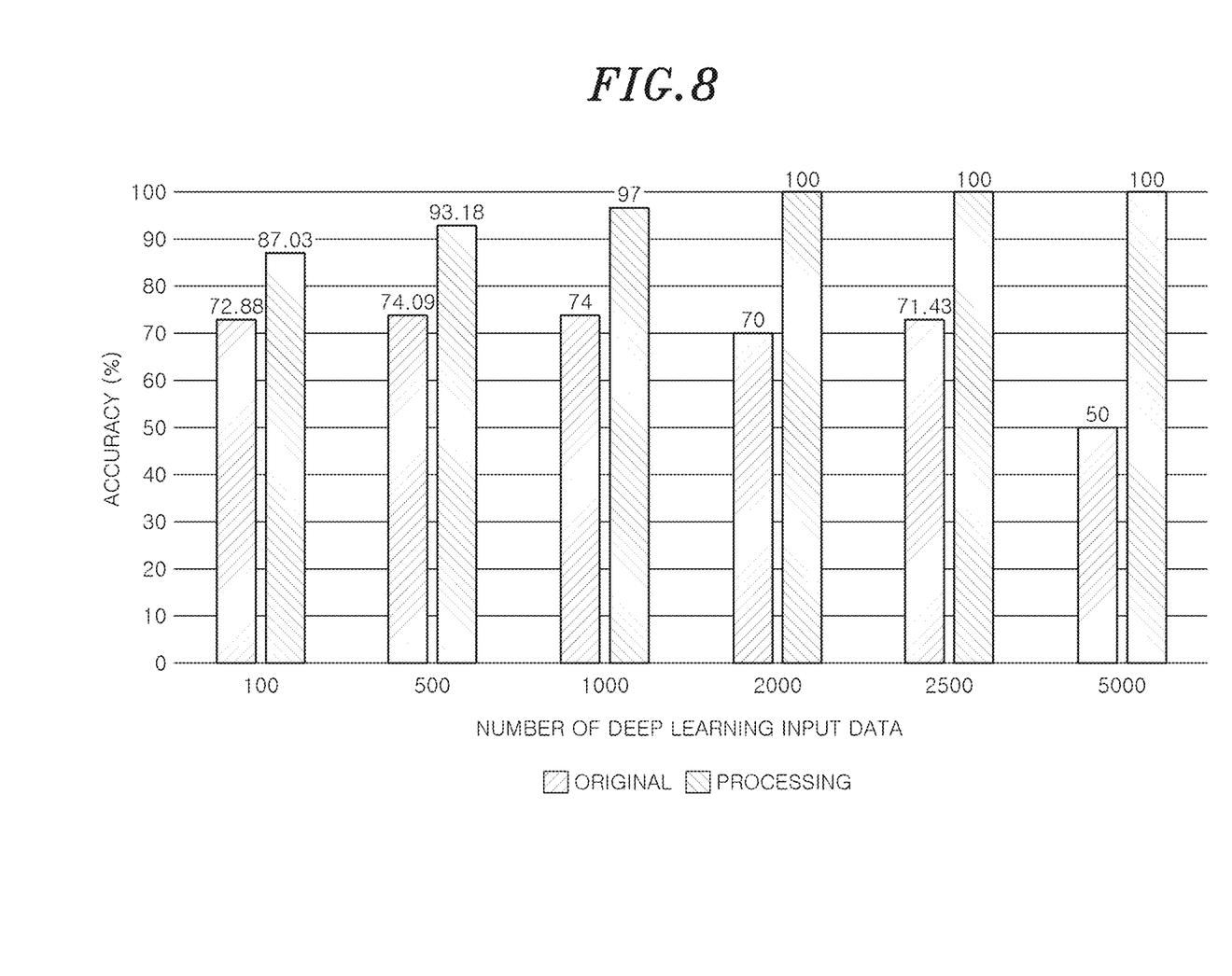
FIG. 8 illustrates a comparison between a result of identifying a nuclide after performing the preprocessing in accordance with the embodiment of the present disclosure and a result of identifying a nuclide for original data without performing the preprocessing.

FIG. 8 illustrates a comparison between a result of identifying a nuclide after performing the preprocessing in accordance with the embodiment of the present disclosure and a result of identifying a nuclide without performing the preprocessing. In the case that the preprocessing is not performed, the accuracy of 50 to 70% was obtained in spite of an increase in number of sample data. On the other hand, in the case that the preprocessing is performed, a high level of accuracy was obtained. For example, the accuracy of about 87.03% is obtained when the number of sample data is 100, the accuracy of about 93.18% is obtained when the number of sample data is 500, the accuracy of about 97% is obtained when the number of sample data is 1000, and the accuracy of about 100% is obtained when the number of sample data is 2000 or more.

A histogram for identifying the nuclide generally requires tens of thousands pieces of data, and usually requires long process time of several tens of minutes or more although it depends on the performance of a circuit. For example, when the radiation source of about 5 uCi is used, it takes about one hour to collect 100,000 pieces of data to identify the nuclide. Further, the accuracy may also be very low in the case of the complex nuclide. On the other hand, when the preprocessing according to the embodiment of the present disclosure is applied, only 2000 pieces of data are collected for about 70 seconds, thus dramatically reducing the number of data required for identifying the nuclide and providing a very high level of accuracy.

Although the nuclide identifying process for the Cs-137/Co-60 complex nuclide has been described by way of example, the embodiment of the present disclosure may be applied to all complex nuclides including nuclides having different representative energy values, such as Na-22, Ba-133, or Eu-152.

Each of the steps included in method for training the nuclide identification model according to the above-described embodiment may be implemented in a non-transitory computer-readable storage medium that stores a computer program programmed to perform the steps.

Further, the processing unit 120 and the model unit 130 included in the training apparatus 100 according to the above-described embodiment may be configured by one, two or more processors, and each step included in the method may be performed by the processor.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable recording medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for training an apparatus for training a nuclide identification model, the method comprising:
   classifying nuclide data into characteristics of energy spectrums for nuclides;
   generating training data based on a number of data in each of the classified characteristics; and
   training the nuclide identification model by using the training data,
   wherein the classifying the nuclide data into the characteristics of the energy spectrums for the nuclides comprises:
      preparing, as raw data for a complex nuclide, background data, single nuclide radiation measurement data, and complex nuclide radiation measurement data, and
      sorting the raw data into the characteristics of the energy spectrums for the nuclides, the characteristics of the energy spectrums for the nuclides being characteristics of energy peaks for the nuclides, wherein the nuclide identification model includes a deep neural network (DNN) containing an input layer, a hidden layer, and an output layer, wherein the input layer receives the nuclide data, wherein the output layer provides an identification result value for the nuclide data corresponding to at least one of the background data, the single nuclide radiation measurement data, and the complex nuclide radiation measurement data, wherein the sorting the raw data into the characteristics of the energy spectrums for the nuclides includes sorting the raw data into the characteristics of the energy peaks for the nuclides based on a plurality of sections including at least one of back scatter, photo peak, and Compton edge, and wherein the generating the training data includes generating the training data to include identification information on each of the plurality of sections.

2. The method of claim 1, wherein the training data includes the number of radiation measurement data for each of the plurality of sections.

3. An apparatus for training a nuclide identification model, the apparatus comprising:
    a memory storing at least one instruction; and
    a processor configured to execute the at least one instruction stored in the memory,
    wherein the at least one instruction, when executed by the processor, causes the processor to:
        classify nuclide data into characteristics of energy spectrums for nuclides,
        generate training data based on a number of data in each of the classified characteristics, and
        train the nuclide identification model by using the training data,
    wherein the at least one instruction, when executed by the processor, causes the processor to further:
        prepare, as raw data for a complex nuclide, background data, single nuclide radiation measurement data, and complex nuclide radiation measurement data, and
        sort the raw data into the characteristics of the energy spectrums for the nuclides, the characteristics of the energy spectrums for the nuclides being characteristics of energy peaks for the nuclides,
    wherein the nuclide identification model includes a deep neural network (DNN) containing an input layer, a hidden layer, and an output layer,
    wherein the input layer receives the nuclide data, and
    wherein the output layer provides an identification result value for the nuclide data corresponding to at least one of the background data, the single nuclide radiation measurement data, and the complex nuclide radiation measurement data,
    wherein the at least one instruction, when executed by the processor, causes the processor to further sort the raw data into the characteristics of the energy peaks for the nuclides based on a plurality of sections including at least one of back scatter, photo peak, and Compton edge, and
    wherein that at least one instruction, when executed by the processor, causes the processor to further generate the training data to include identification information on each of the plurality of sections.

4. The apparatus of claim 3, wherein the training data includes the number of radiation measurement data for each of the plurality of sections.

5. A non-transitory computer-readable storage medium including computer-executable instructions which cause, when executed by a processor, the processor to perform a method for training an apparatus for training a nuclide identification model, the method comprising:
    classifying nuclide data into characteristics of energy spectrums for nuclides;
    generating training data based on a number of data in each of the classified characteristics; and
    training the nuclide identification model by using the training data,
    wherein the classifying the nuclide data into the characteristics of the energy spectrums for the nuclides comprises:
        preparing, as raw data for a complex nuclide, background data, single nuclide radiation measurement data, and complex nuclide radiation measurement data, and
        sorting the raw data into the characteristics of the energy spectrums for the nuclides, the characteristics of the energy spectrums for the nuclides being characteristics of energy peaks for the nuclides,
    wherein the nuclide identification model includes a deep neural network (DNN) containing an input layer, a hidden layer, and an output layer,
    wherein the input layer receives the nuclide data,
    wherein the output layer provides an identification result value for the nuclide data corresponding to at least one of the background data, the single nuclide radiation measurement data, and the complex nuclide radiation measurement data, and
    wherein the sorting the raw data into the characteristics of the energy spectrums for the nuclides includes sorting the raw data into the characteristics of the energy peaks for the nuclides based on a plurality of sections including at least one of back scatter, photo peak, and Compton edge, and
    wherein the generating the training data includes generating the training data to include identification information on each of the plurality of sections.

6. The non-transitory computer-readable storage medium of claim 5, wherein the training data includes the number of radiation measurement data for each of the plurality of sections.

* * * * *